United States Patent [19]

Kleven

[11] Patent Number: 4,980,673
[45] Date of Patent: Dec. 25, 1990

[54] ICE DETECTOR CIRCUIT

[75] Inventor: Lowell A. Kleven, Eden Prairie, Minn.

[73] Assignee: Rosemount Inc., Eden Prairie, Minn.

[21] Appl. No.: 61,168

[22] Filed: Jun. 10, 1987

[51] Int. Cl.$^5$ ............................................. G08B 19/02
[52] U.S. Cl. .................................. 340/581; 340/962; 244/134 F
[58] Field of Search .............. 340/580, 581, 601, 962, 340/583; 244/134 D, 134 F

[56] References Cited

U.S. PATENT DOCUMENTS

| | | | |
|---|---|---|---|
| 3,594,775 | 7/1971 | Fox | 340/581 |
| 4,036,457 | 7/1977 | Volkner et al. | 244/134 D |
| 4,327,286 | 4/1982 | Thoma | 340/583 |

Primary Examiner—Joseph A. Orsino
Assistant Examiner—Jeffery A. Hofsass
Attorney, Agent, or Firm—Kinney & Lange

[57] ABSTRACT

An ice detector circuit for sensing an ice deposition on a sensing surface of an ice detector probe from an air mass flowing relative to the probe. The probe includes a heater to heat the sensing surface and a temperature sensor for sensing the sensing surface temperature during heating. The temperature sensor provides the circuit with an output having a level varying as a function of the sensing surface temperature. The circuit includes a controller which selectively energizes the heater, a timer which provides a timing output representative of a time interval elapsed between selected temperature sensor output levels, and computing means, such as a microprocessor, which computes an output representative of ice deposition as a function of a predetermined relationship between ice deposition and the timing output.

8 Claims, 3 Drawing Sheets

ICE DETECTOR CIRCUIT

CROSS-REFERENCE TO RELATED APPLICATION.

Reference is hereby made to my co-pending U.S. patent application entitled "Ice Detector Probe" filed on even date herewith.

BACKGROUND OF THE INVENTION

1. Field of the Invention

The present invention relates to an ice detector circuit for sensing an ice deposition on a sensing surface of an ice detector probe from an air mass moving relative thereto.

SUMMARY OF THE INVENTION

The present invention comprises an ice detector circuit for sensing an ice deposition on a sensing surface of an ice detector probe from an air mass moving relative to the probe. The probe includes heating means for heating the sensing surface to melt the ice deposition and sensing means for providing a sensor output having a level varying as a function of a temperature of the sensing surface. The circuit comprises controller means coupled to the heating means for selectively energizing the heating means, timing means coupled to the sensor output for providing a timing output representative of at least one interval of time elapsed between selected sensor output levels, and computing means coupled to the timing output having a conversion value representative of a predetermined relationship between the ice deposition and the timing output, for computing an output representative of ice deposition.

In one preferred embodiment the heating means is selectively energized to provide heat to the sensing surface at a controlled rate for melting the ice deposition, such that the timing output varies as a function of an amount of the ice deposition. In a further preferred embodiment, the sensor output is coupled to provide feedback to the controller means, such that the selective energization of heating means by the controller means is a function of the sensing surface temperature. In a further preferred embodiment, the timing output comprises a first timing output representing a first time interval during which ice can deposit on the sensing surface and a second timing output representing a second time interval during which the heating means melts the ice deposition. The computing means computes an output representative of a rate of ice deposition as a function of the first and second time intervals.

DETAILED DESCRIPTION OF THE PREFERRED EMBODIMENTS

Figure 1:
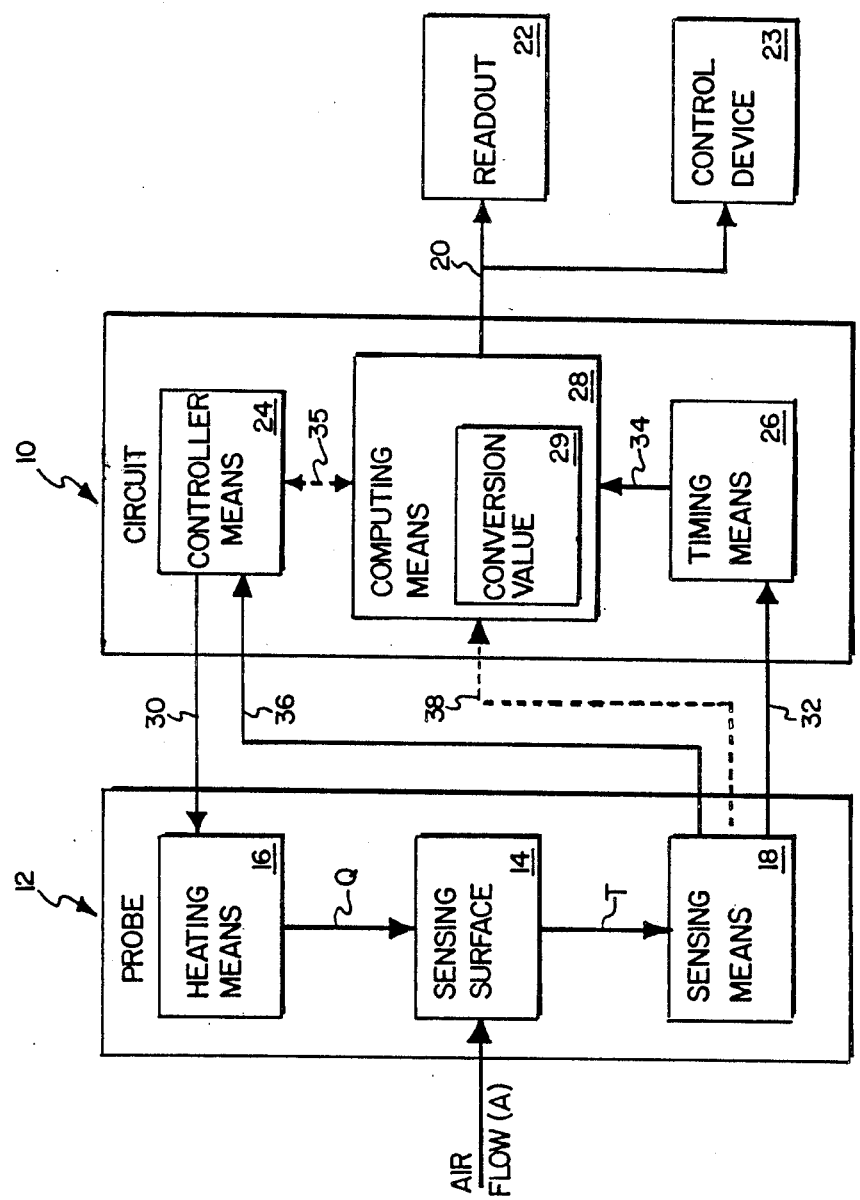
FIG. 1 is a block diagram representation of a preferred embodiment of an ice detector circuit coupled to an ice detector probe according to the present invention.

In FIG. 1 a preferred embodiment of an ice detector circuit according to the present invention is indicated generally at 10. Ice detector circuit 10 is coupled to an ice detector probe, generally shown at 12. The probe 12 includes a sensing surface 14 which is subjected to an air mass moving relative thereto, as shown by arrow A. The air mass can contain atmospheric moisture in a gaseous, liquid or solid state which can deposit ice on the sensing surface 14. The probe 12 also includes means for mounting the probe on any moving or stationary installation on which it is desirable to sense the formation of ice. Heating means 16 in the probe 12 provides heat Q to the sensing surface 14 to melt the ice deposition. The heat Q raises the temperature of the sensing surface over time as a function of an atmospheric moisture deposition thereon. Sensing means 18 in the probe 12 senses a temperature T representative of the temperature of the sensing surface 14 during heating and provides a sensor output to the circuit 10. The sensor output level varies as a function of the sensed temperature T. Circuit 10 computes and provides an output on line 20 to readout 22 which is representative of ice deposition as a function of the time rate of change of the sensing surface temperature.

While the heating means 16 can be physically separate from the sensing means 18, probe 12 preferably comprises a self-heating temperature sensor, i.e., a sensor having dual functions of heating and temperature sensing, such as a thin film resistance element disposed on a substrate having a sensing surface, thus providing an improved thermal coupling between sensing surface 14 and means for heating and sensing An example of such a probe 12 which can be used herewith, and its operation, is fully described in my co-pending U.S. patent application entitled "Ice Detector Probe" filed on even date herewith, assigned to the same assignee as the present invention and which is fully incorporated herein by reference. The circuit 10 can also be adapted for use, for example, with a probe having multiple wire resistance elements, such as the probe described in U.S. Pat. No. 4,333,004, in which case the probe's sensor wire can be coupled to the present circuit 10 to perform dual functions of heating the wire to melt ice depositions formed thereon and provide a sensor output representative of the wire temperature, without requiring the use of the probe's reference wire.

Circuit 10 comprises controller means 24, timing means 26 and computing means 28. Controller means 24 provides a control signal along line 30 for selectively energizing the heating means 16. The control signal, for example, can be turned on at fixed cycle times if desired. Heating means 16 is thermally coupled to sensing surface 14 and provides heat Q to the sensing surface when energized, which raises the sensing surface temperature over time as a function of heat transfer from the heated sensing surface to an ice deposition on the sensing surface 14. Sensing means 18 is thermally coupled to sensing surface 14 for sensing a temperature T representative of the temperature of the sensing surface 14. Sensing means 18 provides a sensor output having a level varying as a function of sensed temperature T along line 32 to timing means 26. Timing means 26 provides a timing output that is representative of at least one interval of time elapsed between selected sensor output levels along line 34 to computing means 28. Computing means 28 includes a conversion value 29 which is representative of a predetermined relationship between the ice deposition and the timing output. Computing means 28 computes and provides an output on line 20 to readout 22 which is representative of ice deposition as a function of the timing output and the conversion value. For example, the measured time required to heat the sensing surface 14 between a range of selected sensing surface temperatures can be simply compared to a stored conversion value which represents a predetermined time interval required to heat the sensing surface 14 between the selected temperature range in the presence of an ice deposition on the sensing surface. This ice deposition sensing cycle can be repeated periodically to monitor changes in icing conditions to which probe 12 is subjected, and the output from circuit 10 can also be provided to a control device 23, such as for deicing equipment, if desired.

Each ice deposition sensing cycle includes a deposition period during which the sensing surface 14 is not being heated and atmospheric moisture can deposit on the sensing surface 14, followed by a heating period during which the sensing surface 14 is heated for sensing and removing the deposition of atmospheric moisture thereon. When a deposition of atmospheric moisture is present on the sensing surface 14, thermal energy from the sensing surface being heated is transferred from the sensing surface to the deposition thereon. As a result of the heat transfer, the rate of change of the sensing surface temperature during the heating period is reduced from that otherwise obtained in the absence of a deposition on the sensing surface 14. When an ice deposition is present on the sensing surface 14 during a heating period, for example, a delay in the temperature increase of the sensing surface results, due primarily to the effect which the latent heat of fusion of ice produces as the ice deposition is being melted. This change in the rate of increase of sensing surface temperature which is associated with the heat of fusion of ice is used by circuit 10 to detect an ice deposition on the sensing surface 14. In a preferred embodiment of circuit 10, heating means 16 is selectively energized by circuit 10 to provide heat to sensing surface 14 at a controlled rate such that the duration of the heating period varies as a function of an amount of atmospheric moisture deposited on the sensing surface during the preceding deposition period.

Figure 2:
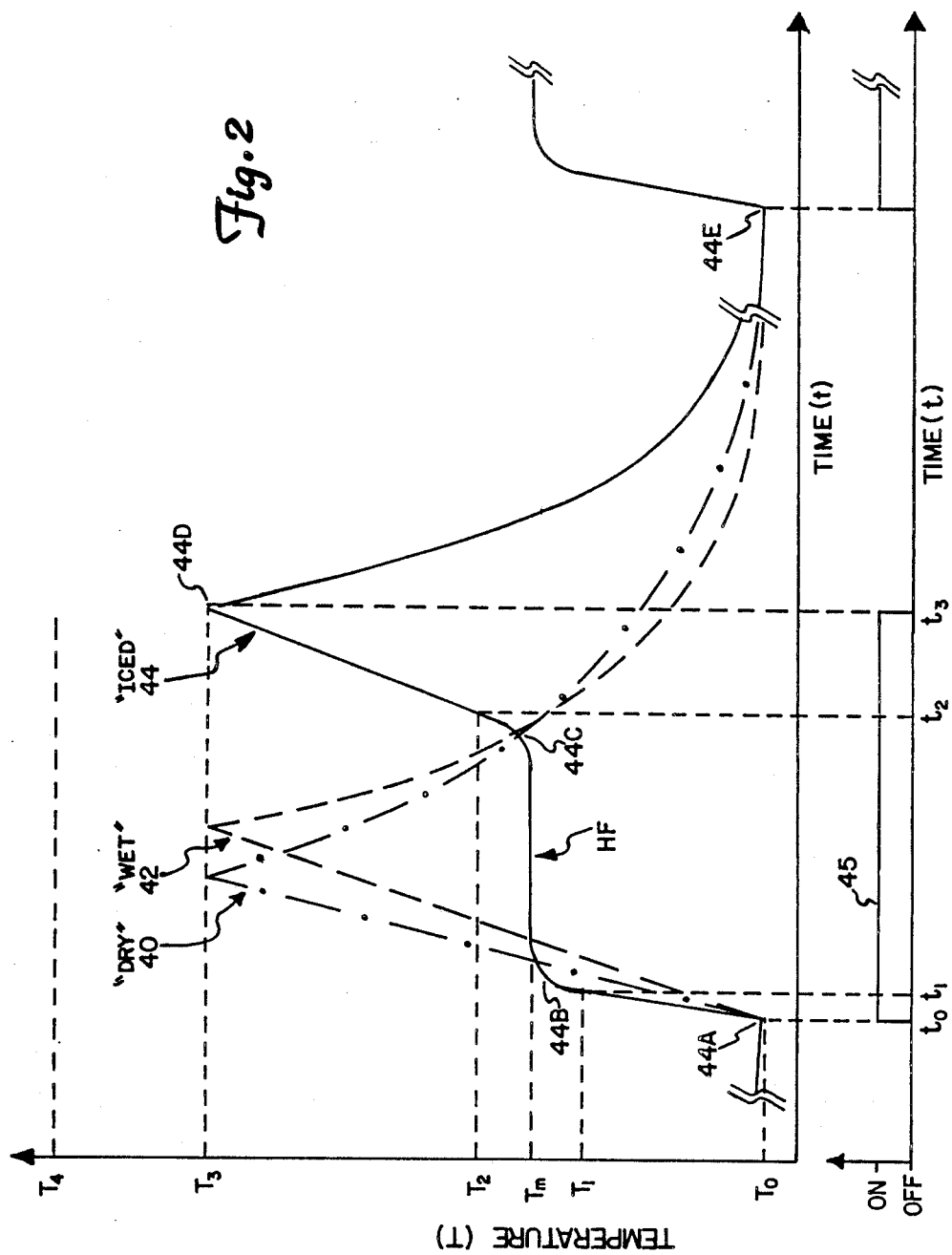
FIG. 2 is a graph of ice detector temperature signals as a function of time for the circuit of FIG. 1 under three different conditions.

FIG. 2 illustrates the effect which a deposition of atmospheric moisture on the sensing surface 14 causes with respect to the rate at which the sensing surface temperature can be increased during a heating period. The horizontal axes represent time t during which the sensing surface 14 is heated, e.g., $t_0$ to $t_3$. The upper vertical axis represents a sensed temperature T of the sensing surface 14, e.g., $T_0$ to $T_3$, which is attained by energization of the heating means 16, and the lower vertical axis represents the selective energization of the heating means 16. $T_0$ represents a sensed equilibrium temperature to which the sensing surface 14 has cooled at the end of the deposition period and immediately prior to energization of the heating means 16. $T_3$ represents a sensed preselected temperature to which the sensing surface 14 is heated during the heating period and at which temperature the heating means 16 is de-energized. $T_3$ is preferably of a magnitude sufficient to clear the sensing surface 14 of substantially all atmospheric moisture deposited thereon in advance of a subsequent cycle's deposition period. The upper heating threshold temperature $T_3$ can preferably be selected such that melting of an ice deposition is assured even under severe icing conditions, while also constituting a temperature that is sufficiently low to avoid overheating of the probe which advantageously promotes energy savings and longer life of the probe's temperature sensing and heating means. The selective energization of heating means 16 during a heating period is shown at line 45 along the lower horizontal axis of FIG. 2.

In a preferred embodiment, sensing means 18 couples the sensor output to controller means 24 along line 36 to provide feedback for selective de-energization by controller means of heating means 16, such that the heating period is controlled as a function of the sensor output. The heating means 16 and controller means 24 thus operate in a closed-loop relationship, such that the probe's sensing surface 14 is not heated above a temperature corresponding to the desired upper heating threshold temperature $T_3$. If desired, sensing means 18 can couple sensor output to computing means 28 along line 38. A failure detection threshold temperature, e.g., $T_4$, can be preselected at a temperature above that of the desired upper heating threshold temperature $T_3$, such that an undesired overheating or damage to the probe's sensor can be detected by computing means 28 and a suitable output representative of such failure or damage can be provided to readout 22.

The relative rates of temperature change for three different sensing surface conditions are generally illustrated in FIG. 2, namely, "dry", "wet" and "iced" conditions. A "dry" condition, meaning substantially no atmospheric moisture is in contact with the sensing surface 14 during a portion of the heating period, is indicated by a dotted-dashed curve at 40. A "wet" condition, meaning atmospheric moisture substantially in the form of liquid water is deposited on the sensing surface 14 during a portion of the heating period, is indicated by a dashed curve at 42. An "iced" condition, meaning atmospheric moisture is deposited on the sensing surface 14 substantially in the form of ice during a portion of the heating period, is indicated by a solid curve at 44.

A comparison of the three curves 40, 42 and 44 demonstrates that heating the sensing surface 14 to sensed temperature $T_3$ from sensed temperature $T_0$ in an "iced" condition requires a substantially longer interval of time, e.g., total time interval of heating period = $t_3-t_0$, than that required for a "wet" or "dry" condition, due primarily to the effect which the latent heat of fusion of ice produces as the ice deposition is being melted. Heat supplied by the heating means 16 during the heating period in an "iced" condition is transferred from the sensing surface 14 for heating, melting and removing the ice deposition, as shown by curve segment 44A–44D. Curve segment 44A–44B represents the sensed temperature T of the sensing surface 14 during a first portion of the heating period during which the sensing surface 14 and a portion of the ice deposition adjacent thereto are heated from a sensed equilibrium temperature $T_0$ to a sensed melting point temperature $T_m$ that is representative of the melting temperature of ice, which is approximately 0° C. at one atmosphere. The relatively high rate of heating observed during this first portion of the heating period is a function of the relatively small quantity of thermal energy required to heat ice, i.e., the specific heat capacity of ice is approximately 0.5 calories/gram/°C., and thermally insulating effects which the ice deposition provides the sensing surface 14 thus reducing convective heat transfer to the airflow. Once the melting temperature of the ice deposition is reached, however, a substantially greater quantity of thermal energy is required to be transferred from the sensing surface 14 to melt the ice deposition. The latent heat of fusion of ice is approximately 80 calories/gram of ice at 0° C. and one atmosphere. Accordingly, curve segment 44B-44C represents the sensed temperature T of the sensing surface 14 during a second portion of the heating period during which the ice deposition is melted, and the relatively stable melting temperature at which the sensing surface 14 and ice deposition remain during this heat of fusion transition produces a generally flat rate of heating, which transition is shown generally as plateau HF. Curve segment 44C-44D represents the sensed temperature T of the sensing surface 14 during a third portion of the heating period during which water residue from the melted ice deposition is heated, and generally corresponds to the rate of temperature change of the sensing surface 14 in a "wet" condition. At the end of the present heating period, the sensing surface 14 is substantially clear of atmospheric moisture deposited during the present ice deposition sensing cycle, and the heating means 16 is turned off which allows the sensing surface to cool and another cycle's deposition period to follow, e.g., curve segment 44D-44E.

Circuit 10 measures a rate of change of sensing surface temperature during a heating period by measuring an interval of time elapsed, e.g., measured time interval = $t_2 - t_1$, while heating the sensing surface 14 from a sensed, preselected lower timing threshold temperature $T_1$ to a sensed, preselected upper timing threshold temperature $T_2$. $T_1$ is preferably selected to substantially correspond to the sensed melting point temperature $T_m$, or slightly below thereof, and $T_2$ is preferably selected to substantially correspond to a temperature which is slightly above the sensed melting point temperature $T_m$, such that at least a portion of the heat of fusion transition HF lies within the temperature range defined between $T_1$ and $T_2$.

It is known, however, that the melting temperature of an ice deposition can vary, for example, as a function of changes in the purity of the atmospheric moisture from which the probe's ice deposition is formed. For example, an ice deposition formed from atmospheric moisture having impurities such as salt or other contaminants dissolved therein has a reduced melting temperature, by as much as 2° C. to 3° C. below the normal melting temperature of ice. Accordingly, it is also desirable that the threshold temperatures $T_1$ and $T_2$ are selected such that the temperature range defined therebetween is sufficiently broad to encompass a range of melting temperatures which correspond to a range of varying atmospheric conditions over which the probe 12 and circuit 10 can be expected to function.

It is noted that there can be a temperature gradient between the sensing surface temperature and the temperature T sensed by sensing means 18, depending upon the heat transfer characteristics between the sensing surface 14 and sensing means 18. In one embodiment, for example, an improved thermal coupling is attained between the sensing surface 14 and the heating means 18 and sensing means 16 which are coupled thereto, wherein the dual functions of heating and sensing the temperature of the sensing surface are performed by a thin film platinum resistor thermometer, as described in the co-pending U.S. patent application entitled "Ice Detector Probe". Use of a substrate formed of sapphire having a thickness of approximately 0.3 millimeters, for example, wherein a thin film of platinum is deposited on one side and the side opposite thereof is exposed to the airflow to form the probe's sensing surface, produces a temperature gradient of approximately 3° C. between the substrate's opposite sides. It is necessary, therefore, that the temperature thresholds $T_1$, $T_2$, $T_3$ and $T_4$ are selected such that such a temperature gradient between sensing surface 14 and sensing means 18 is accommodated.

During melting of an ice deposition, a temperature gradient is also introduced in a water layer which forms between the sensing surface 14 and a portion of the ice deposition which is adjacent thereto, which also affects the selection of the temperature thresholds. In a preferred embodiment, heat Q is provided by the heating means 16 to the probe's sensing surface 14 at a relatively constant rate of flow. A transfer of heat Q from the sensing surface 14 to an ice deposition on the sensing surface increases the temperature of the ice deposition. Once the portion of the ice deposition which is adjacent to the sensing surface 14 reaches the melting temperature, however, the ice deposition begins to melt and forms a water layer between the sensing surface 14 and the adjacent portion of the ice. Unless the probe includes means for removing the water layer during melting of the ice deposition, the thickness of the water layer will increase causing movement of the melting interface between the water layer and ice away from the sensing surface 14. Since the temperature at the melting interface comprises the melting temperature of ice, and the heat input Q is relatively constant, with an increase in the water layer thickness there is a corresponding increase in the temperature of the sensing surface 14. Consequently, with increasing water layer thickness during melting of an ice deposition, the sensed temperature T of the sensing surface 14 will increase during the heat of fusion transition, which requires selection of correspondingly higher temperature thresholds and undesirably reduces energy efficiency and life of the probe. It is therefore desirable that the probe include means for removing the water layer, or at least maintaining the water layer at a relatively constant thickness, such that the sensing surface temperature remains generally stable during melting of the ice deposition. Maintaining a relatively flat rate of temperature change during the heat of fusion transition HF thus increases the ice detector probe's sensitivity to ice deposition in that the difference observed between rates of temperature change in an iced and non-iced condition are greater. An example of such a probe which includes means for water layer removal is fully explained in the co-pending U.S. patent application entitled "Ice Detector Probe".

A probe 12 constructed of the type described in the co-pending U.S. patent application entitled "Ice Detector Probe" which was tested with the present circuit 10, for example, is useful in illustrating a range of threshold temperatures which can be selected. In one test condition, the probe was subjected to an airflow having a velocity of approximately 350 knots and the melting temperature of ice comprised approximately 0° C. The probe's heating means 16 and sensing means 18 comprised a sensor having a thin film platinum resistance element deposited on one side of a sapphire substrate having a thickness of approximately 0.3 mm, with the opposite side of the substrate disposed to the airflow to form the probe's sensing surface 14. The probe delivered a power density for heating the sensing surface 14 of approximately 0.25 watts/mm$^2$. The probe 12 included aerodynamic means for removing the water layer formed during melting of the ice deposition, such that the water layer thickness did not substantially exceed that of 0.02 mm, and the probe's sensed melting point temperature $T_m$ of approximately 10° C. remained substantially constant during the heat of fusion transition HF. Approximately 3° C. of the 10° C. temperature gradient produced between the temperature sensing resistance element and the melting interface formed between the adjacent surfaces of the water layer and ice deposition is attributable to the substrate's thermal resistance and the remaining 7° C. is attributable to the water layer's thermal resistance. A selection, therefore, of the lower timing threshold temperature $T_1$ can comprise a temperature ranging from 0° C. to as much as 20° C. below the sensed melting point temperature $T_m$ of 10° C., i.e., between −10° C. and 10° C. A selection of the upper timing threshold temperature $T_2$ can comprise, for example, a temperature ranging from 0.5° C. to as much as 20.5° C. above the sensed melting point temperature $T_m$ of 10° C., i.e. between 10.5° C. and 30.5° C. Since, however, the probe provides a relatively constant melting point temperature during the heat of fusion transition HF, the ranges selected for $T_1$ and $T_2$ are preferably narrower, such as $T_1$ ranging between 0° C. and 5° C. below $T_m$ and $T_2$ ranging between 0.5° C. and 5.5° C. above $T_m$. The temperatures selected, however, for the temperature thresholds will depend upon thermodynamic characteristics of the probe 12 used with the circuit 10, such as temperature gradients introduced between the sensor and the melting ice deposition, as well as the manner in which the probe aerodynamically receives the airflow, as well as removal of the water layer during melting of the ice deposition.

Figure 3:
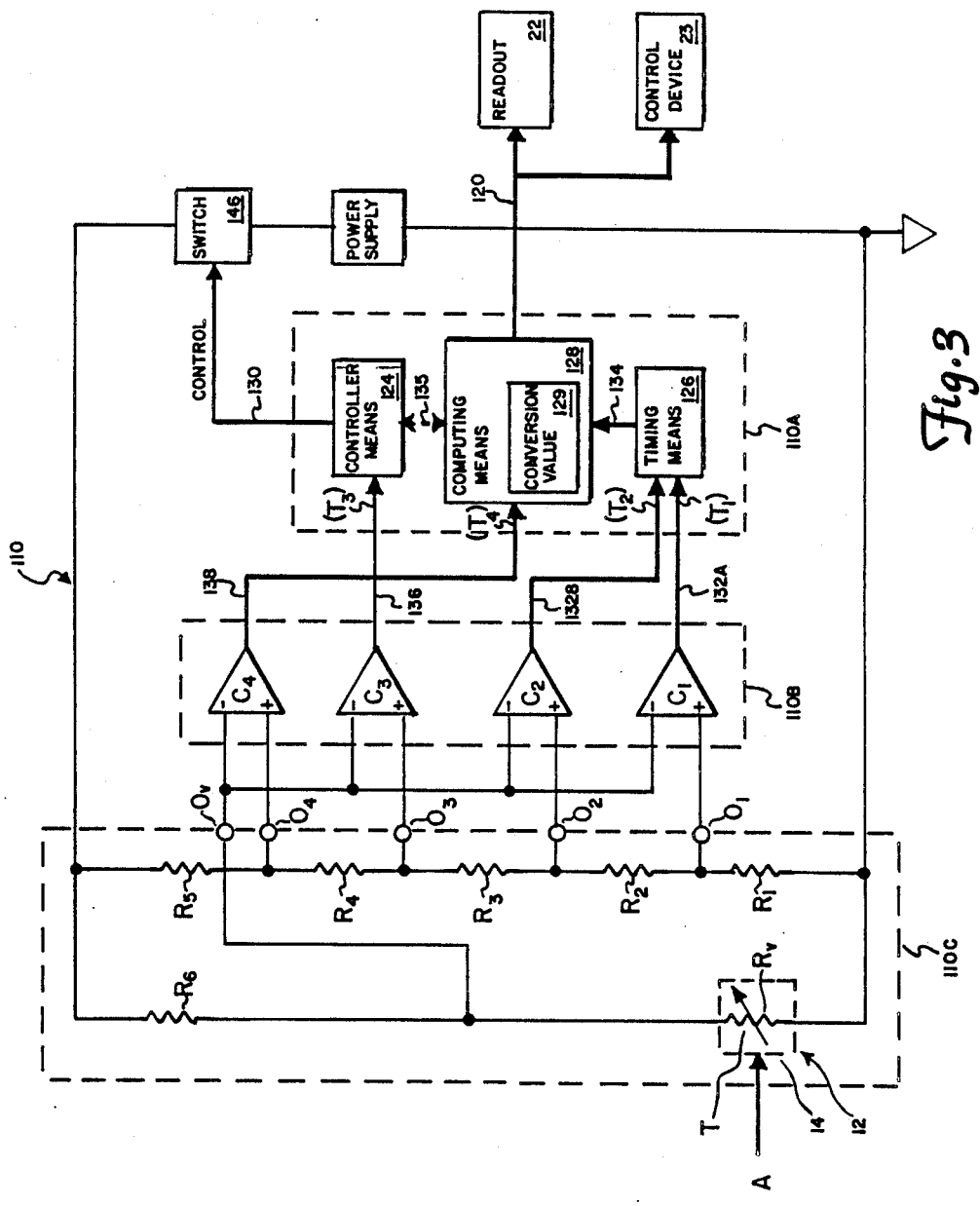
FIG. 3 is a partial block, partial schematic diagram representation of a further preferred embodiment of an ice detector circuit.

FIG. 3 is a partial block, partial schematic diagram showing a preferred embodiment of an ice detector circuit 110 coupled to an ice detector probe 12 having a self-heating resistance temperature sensor $R_v$ including a sensing surface 14 which is disposed to receive a flow, arrow A, of the air mass.

Ice detector circuit 110 includes a logic circuit 110A, a comparator circuit 110B, and a temperature sensing circuit 110C. Logic circuit 110A includes controller means 124, timing means 126 and computing means 128. Temperature sensing circuit 110C provides an output at output terminal $O_v$ having a level which varies as a function of the sensed temperature T of the sensing surface 14. Temperature sensing circuit 110C preferably comprises a resistance bridge circuit including resistors $R_1$, $R_2$, $R_3$, $R_4$, $R_5$ and $R_6$, in which the temperature sensor $R_v$ is connected. Temperature sensor can comprise a self-heating, thin film platinum resistance thermometer. Resistors $R_1$, $R_2$, $R_3$, $R_4$, $R_5$ and $R_6$ preferably have a low temperature coefficient of resistivity and are not substantially affected by heat produced by temperature sensor $R_v$ or by the airflow, arrow A, impinging upon the probe 12. Comparator circuit 110B comprises a plurality of comparators $C_1$, $C_2$, $C_3$ and $C_4$ which are each coupled to output terminal $O_v$ and respective output terminals $O_1$, $O_2$, $O_3$ and $O_4$ of temperature sensing circuit 110C. Temperature sensing circuit 110C and comparator circuit 110B are thus selected and arranged to establish desired sensing thresholds that are representative of preselected temperature thresholds for the probe's sensing surface 14, e.g., $T_1$, $T_2$, $T_3$ and $T_4$. Comparator circuit 110B is coupled to logic circuit 110A and provides outputs which are representative of the sensed temperature T of the sensing surface 14 having reached the preselected temperature thresholds during the heating period. Comparators $C_1$, $C_2$, $C_3$ and $C_4$ preferably comprise Schmitt trigger type comparators having suitable biases and switching hysteresis with respect to the selected resistors of the temperature sensing circuit 110C and desired temperature thresholds, such that a digital output representative of the occurrence of such temperature thresholds during heating is provided.

During operation, controller means 124 initiates a heating period by providing a control signal on line 130 to enable a power supply switch 146 which selectively energizes temperature sensing circuit 110C, causing temperature sensor $R_v$ to begin heating the sensing surface 14. When the potential at output terminal $O_v$ exceeds the potential set at output terminal $O_1$ as a function of the increase in the sensed temperature T due to such heating, for example, then comparator $C_1$ is triggered and provides an output along line 132A to timing means 126 which is representative of the sensed temperature T having reached a lower timing threshold temperature $T_1$. Output from comparator $C_2$ is coupled to timing means 126 along line 132B which is representative of the sensed temperature T of the sensing surface 14 having reached an upper timing threshold temperature $T_2$. Timing means 126 provide a timing output along line 134 to computing means 128 which is representative of at least one interval of time elapsed, e.g., measured time interval = $t_2-t_1$, between selected sensed temperature thresholds, e.g., $T_1$ and $T_2$. Computing means 128 include a conversion value 129 representative of a predetermined relationship between deposition of atmospheric moisture on the sensing surface 14 and the timing output. Such conversion value 129 can comprise, for example, a suitable lookup table, such as a programmable read only memory device having conversion data based upon recorded test results, data determined theoretically and other such information which correlate varying lengths of a selected timing interval, e.g., $t_2-t_1$, with predetermined depositions of atmospheric moisture, e.g., sensing surface ice depositions. The conversion value can also comprise an algorithm representative of a relationship determined between the timing output and deposition of atmospheric moisture on the probe's sensing surface 14. Computing means 128 then compute and provide an output along line 120 as a function of the conversion value and timing output for direct readout or control purposes.

In the preferred embodiment of FIG. 3, temperature sensing circuit 110C and comparator circuit 110B cooperate to provide outputs along lines 136 and 138 to the logic circuit 110A that are representative of the occurrence of temperature thresholds $T_3$ and $T_4$, which comprise feedback such that the selective energization for heating of the sensing surface 14 is a function of the sensing surface temperature. Comparator $C_3$ couples an output to controller means 124 along line 136 which is representative of the sensed temperature T of the sensing surface 14 having reached an upper heating threshold temperature $T_3$, and a control signal from controller means 124 to power supply switch 146 is provided to de-energize bridge 110C and temperature sensor $R_v$. Comparator $C_4$ couples output to computing means 128 along line 138 which is representative of the sensed temperature T of the sensing surface 14 having reached a failure detection threshold temperature $T_4$ that indicates an undesired overheating of the sensing surface 14 or a damaged temperature sensor $R_v$. In such event, a suitable output representative of such detected failure can be provided by computing means 128 along line 120 to readout 22.

During operation, temperature sensing circuit 110C is preferably selectively energized by logic circuit 110A such that the temperature sensor $R_v$ provides heat to the probe's sensing surface 14 at a controlled rate, whereby the timing output varies as a function of an amount of the ice deposition. In a further preferred embodiment, a rate of ice deposition on the sensing surface 14 is further computed. In such case, the timing means 126 provides a first timing output which is representative of a first interval of time during which ice can deposit on the sensing surface 14 and a second timing output which is representative of a second interval of time during which the ice deposition is melted, such that computing means 128 further computes and provides an output representative of a rate of ice deposition as a function of the first and second time intervals. The first time interval can comprise, for example, a period of time which generally extends from the end of the preceding ice deposition sensing cycle's heating period to the beginning of the heating period included in the present cycle for which the rate is being determined. For example, curve segment 44D–44E shown in FIG. 2 represents a deposition period which can comprise the first time interval for an ice deposition sensing cycle which includes the immediately following heating period partially illustrated as the upwardly sloping curve segment commencing at point 44E. The second time interval can comprise, for example, a period of time which generally encompasses the heat of fusion transition, e.g., plateau HF of FIG. 2, encountered during the heating period included in the present cycle for which the rate is being determined. For example, the second time interval can comprise a measured time required to elevate the sensed temperature T from $T_1$ to $T_2$, i.e., $t_2-t_1$.

Logic circuit 110A can repeat ice deposition sensing cycles at fixed or variable intervals of time, as desired. Controller means 124 can be coupled, for example, to computing means 128 along line 135 for interactive control of the cycles. Logic circuit 110A can comprise a conventional microcomputer system programmed to perform the desired logic functions, such as timing, controlling, computing and memory functions. Alternatively, the timing output can be provided to an air vehicle on board air data computer which performs the computing and memory functions, if desired.

The present ice detection circuit offers significant advantages. Since the circuitry computes the rate of sensing surface temperature change by simple measurement of time intervals elapsed between preselected sensing surface temperatures, relatively simple, low cost timing circuitry of conventional design can be used, and only a single temperature sensor is needed. The circuitry is primarily digital and is therefore readily fabricated as a custom integrated circuit using processes common to the semiconductor industry which advantageously provide desired size and weight reductions for use in aerospace applications. The circuitry can automatically adapt for use with probes having varying heat transfer characteristics, and is therefore capable of a broad range of applications.

Although the present invention has been described with reference to preferred embodiments, workers skilled in the art will recognize that changes may be made in form and detail without departing from the spirit and scope of the invention.

I claim:

1. An ice detector circuit for sensing an ice deposition on a sensing surface of an ice detector probe from an air mass moving relative thereto, the probe including heating means for heating the sensing surface to melt the ice deposition and sensing means for providing a sensor output having a level varying as a function of a temperature of the sensing surface, the circuit comprising:
   controller means coupled to the heating means for selectively energizing the heating means;
   timing means coupled to the sensing means for providing a timing output representative of at least one interval of time elapsed between selected sensor output levels while the sensing surface is affected by heat from the heating means; and
   computing means coupled to the timing means, said computing means having a conversion value representation of a predetermined relationship between the ice deposition and the elapsed time represented by the timing output, for providing an output representative of ice deposition on the sensing surface.

2. The circuit of claim 1, wherein the selective energization of the heating means provides heat at a controlled rate for melting the ice deposition, such that the timing output varies as a function of an amount of the ice deposition.

3. The circuit of claim 1, wherein the sensor output levels comprise a first sensor output level representing a lower timing threshold temperature and a second sensor output level representing an upper timing threshold temperature.

4. The circuit of claim 3, wherein the lower timing threshold temperature is not greater than the melting temperature of ice and the upper timing threshold temperature is greater than the melting temperature of ice, such that the timing output varies as a function of melting an ice deposition on the sensing surface.

5. The circuit of claim 1, wherein the controller means is further compiled to the sensing means to provide feedback, such that the selective deenergization of the heating means is a function of the temperature of the sensing surface.

6. An ice detector for providing an output representative of an ice deposition from an air mass moving relative thereto, comprising:
   an ice detector probe having a sensing surface for receiving the ice deposition and having heating means for heating the sensing surface to melt the ice deposition and having sensing means for providing a sensor output having a level varying as a function of a temperature of the sensing surface;
   controller means coupled to the heating means for selectively energizing the heating means; and
   timing means coupled to the sensing means for providing a timing output representative of at least one interval of time elapsed between selected sensor output levels, the timing output further representing the ice deposition, the selected sensor output levels comprising a first output which is a function of a temperature not greater than the melting of the ice to be detected and a second output which is a function of a temperature greater than the melting temperature of the ice to be detected.

7. An ice detector circuit for sensing an ice deposition on a sensing surface of an ice detector probe from an air mass moving relative thereto, the probe including heating means for heating the sensing surface to melt the ice deposition and sensing means for providing a sensor output having a level varying as a function of a temperature of the sensing surface, the circuit comprising:

controller means coupled to the heating means for selectively energizing the heating means at a controlled rate for melting the ice deposition such that the sensor output varies as a function of an amount of ice deposition;

timing means coupled to the sensing means for providing a first timing output which is representative of a first interval of time during which ice can deposit on the sensing surface and a second timing output which is represented of a second interval of time during which the heating means melts the ice deposition; and computing means coupled to the timing means, said computing means having a conversion value representative of a predetermined relationship between the ice deposition and the first and second timing outputs, for providing an output representative of ice deposition.

8. The circuit of claim 7, wherein the computing means further computes an output representative of a rate of ice deposition as a function of the first and second time intervals.

* * * * *

UNITED STATES PATENT AND TRADEMARK OFFICE
CERTIFICATE OF CORRECTION

PATENT NO. : 4,980,673

DATED : December 25, 1990

INVENTOR(S) : Lowell A. Kleven

It is certified that error appears in the above-identified patent and that said Letters Patent is hereby corrected as shown below:

On the title page:
In the References Cited Section, under U.S. PATENT DOCUMENTS, add the following:

| | | | |
|---|---|---|---|
| 4,333,004 | 6/1982 | Forgue et al. . . | 219/497 |
| 3,517,900 | 6/1970 | Roussel . . . . . | 244/134 |
| 2,766,619 | 10/1956 | Tribus et al. . . | 73/170 |

Col. 7, line 50 after "sensor" (second occurrence), insert --$R_v$--.

Col. 10, line 38, delete "compiled" and insert --coupled--.

Signed and Sealed this

Sixteenth Day of February, 1993

Attest:

STEPHEN G. KUNIN

Attesting Officer

Acting Commissioner of Patents and Trademarks